United States Patent [19]

van der Marel

[11] Patent Number: 4,923,710

[45] Date of Patent: May 8, 1990

[54] METHOD FOR THE PREPARATION OF A ROASTED NUT-LIKE PRODUCT

[75] Inventor: Frans van der Marel, Oud Beijerland, Netherlands

[73] Assignee: Solnuts B. V., Tilburg, Netherlands

[21] Appl. No.: 166,374

[22] Filed: Mar. 10, 1988

[30] Foreign Application Priority Data

Apr. 29, 1987 [NL] Netherlands .......................... 8701014

[51] Int. Cl.$^5$ ................................................ A23L 1/36
[52] U.S. Cl. ...................................... 426/634; 426/460
[58] Field of Search ............... 426/629, 632, 634, 598, 426/443, 456, 459, 460, 465, 466

[56] References Cited

U.S. PATENT DOCUMENTS

| | | | |
|---|---|---|---|
| 1,088,875 | 3/1914 | Brainin | 426/634 |
| 1,774,110 | 8/1930 | Sloat . | |
| 2,135,593 | 11/1938 | Nohe | 426/634 |
| 2,135,594 | 11/1938 | Nohe | 426/634 |
| 2,329,080 | 9/1943 | Raymond | 426/629 |
| 3,407,073 | 10/1968 | Guidarelli | 426/629 |
| 3,594,184 | 7/1971 | Hawley | 426/634 |
| 3,594,185 | 7/1971 | Hawley | 426/634 |
| 3,881,033 | 4/1975 | Steele | 426/466 |
| 4,273,796 | 6/1981 | Maxcy et al. | 426/634 |

FOREIGN PATENT DOCUMENTS 1580933 9/1969 France .
460811 2/1937 United Kingdom .

OTHER PUBLICATIONS

Hoshijo 1982, Kathy Cooks Naturally Bantam Books, New York, 388–389.
Horton 1972 Country Commune Cooking, Coward, McCann and Geoghegan Inc., New York, 229–230.
Hunter 1977, The Natural Foods Cookbook, Jove Publications, Inc., New York, 192–193.
Zucker und Susswaren Wirtschaft, vol. 38, No. 10, 1985, pp. 425–426.

*Primary Examiner*—Carolyn Paden
*Attorney, Agent, or Firm*—Foley & Lardner, Schwartz, Jeffery, Schwaab, Mack, Blumenthal & Evans

[57] ABSTRACT

There is provided a method for preparing a roasted nut-like product from soy beans. Raw soy beans are deskinned and split in bean halves which are soaked at temperatures of 20°–100° C. for swelling. After being dewatered, the bean halves are subjected to fast drying and mildly roasting in hot air at temperatures of 160°–350° C. During the fast drying the bean halves are first subjected to a high temperature for fixing their outer skin to a high temperature, whereafter post-drying is performed at lower temperatures for removing the interior moisture.

8 Claims, No Drawings

METHOD FOR THE PREPARATION OF A ROASTED NUT-LIKE PRODUCT

BACKGROUND OF THE INVENTION

The invention relates to a method for the preparation of a roasted nut-like product from soy beans, whereby raw soy beans are deskinned and split, the deskinned bean halves are soaked in water and the soaked bean halves are dried and mildly roasted.

As is known, soy beans are rich in precious proteins and fats, suitable as nutrients. Therefore there is a continuous search for possibilities to make soy beans suitable for consumption. This resulted amongst others in a nut-like product, prepared according to the method described above. The product thus obtained has, however, defects both with respect to taste as well as properties.

A nut-like product, that may be used as substitute for that, should comply with specific requirements with respect to taste, appearance and brittleness (crispness). This has not been fully achieved hitherto; the unpleasant soy taste has not completely disappeared and the "soy nut" is too small and too hard.

BRIEF SUMMARY OF THE INVENTION

It is now the object of the present invention to provide a method with which "soy nuts" can be produced from raw soy beans, which do not possess the defects mentioned above, and comply with a high standard for both taste, appearance as well as cripness.

DETAILED DESCRIPTION OF THE INVENTION

To that purpose the invention provides a method, as described in the introduction, characterized in that the bean halves are soaked at temperatures of 20°-100° C., and that the soaked bean halves, after having been dewatered, are dried fast and are mildly roasted in hot air at temperatures of 160-350° C, during which process the bean halves are first exposed to a high temperature for fixing of their outer layer and are subsequently post-dried at lower temperatures for removal of interior moisture.

The invention is based on the insight acquired, that for obtaining a desired brittleness for the final product, care should be taken, that the soy bean halves will swell sufficiently during soaking, and that this expansion is not undone during drying and roasting. According to the invention the bean halves are preferably blanched at a temperature of 60°-85° C. and subsequently soaked and/or boiled at a temperature of 60°-100° C.

Thereby the bean halves will swell up to the two-threefold of their volume, while the beans retain a proper light yellow colour, while moreover the characteristic soy taste is removed, and enzymes such as lipoxygenase, unrease and the trypsine inhibitor are deactivated, which improves taste, keeping qualities and nutrition value of the final product significantly.

It is usually to be expected, that the expanded bean halves will shrink again on drying and roasting, which would imply a final product with little brittleness. By after dewatering fast drying the soaked bean halves at a high temperature of at least 250° C. in hot air, a fixation of the surface layer of the bean half is achieved by the fast drying thereof. After this fixation drying is continued at a lower temperature in order to remove the interior moisture. Thus no substantial shrinking of the bean will occur on account of the stiffness of the surface layer. Because during soaking it is seen to that the water is homogeneously distributed in the bean halves, the latter acquire a balanced porous structure, after removal of the interior moisture during drying, providing the desired crispness to the final product.

In the invention drying and roasting can be accomplished effectively by subsequently passing the dewatered bean halves through a first drying area with an inlet temperature of about 250° C. and an outlet temperature of about 90° C., a second drying area with an inlet temperature of about 220° C. and an outlet temperature of about 115° C., and a third drying area with an inlet temperature of about 160° C. and an outlet temperature of about 100° C. The residence time in any of these drying areas may be effectively about 8-12 minutes.

The method according to the invention is excellently suitable for a completely automated total process, wherein the inlet product is raw soy beans, and the final product crisp soy nuts, whole or more or less comminuted. Such an automated process may be obtained by making use for blanching of a blancher, provided with a conveyor screw, whereon an elongated boiling tube is connected, while for drying and roasting use is made of one or more drying areas, each consisting of a fluid conveyor bed, wherein hot air is blown from down upwards, and a pressure gradient sees to further conveyance. Such a process is very economical and provides an excellent final product.

This final product, the soy nut, has a pleasant light yellow appearance, has a brittle crispness, and does not have a disturbing taste. The nuts thus obtained may be flavoured with flavouring agents known as such, so that a product is obtained comparable in use with the various existing types of nuts. It is also possible to process the product as a whole or in comminuted condition in many foodstuffs, for example in muesli, as fancy cake framing, and many other applications, which will be obvious after the above.

The invention will be further elucidated in the following by an example.

EXAMPLE

Deskinned soy bean halves with a moisture content of 10-13%, a bulk density of 750-800 kg/m$^3$, a specific mass of 1200 kg/m$^3$, and a weight of 1000 granules of 75 g are added to water of 70°-85° C., and soaked for 10-15 minutes until an average moisture content of 40-50% was obtained. Subsequently the mass was soaked for 15-20 minutes at 85°-100° C., whereby a moisture content of 50-65 % was achieved. During this treatment the soy beans swelled to over twice their size, and it appeared from investigations that the bitter-making taste had disappeared.

Subsequently the moist soy bean halves were dewatered on a sieve, whereupon they had a bulk density of 650-700 kg/m$^3$. The dewatered bean halves were subsequently dried fast and intensively with dry air with a dew point between 30°-90° C. by passing them over three drying beds, wherein hot air was blown. The inlet temperatures of the three drying beds were 250° C., 220° C. and 160° C. respectively. The passing speed was adjusted in such a way, that the average residence time per drying bed was 10-12 minutes.

At the outlet of the last drying bed a nut-like final product is obtained, that had retained the greater part of its expansion, and that had a moisture content of between 1-4 %, a bulk density of 350-450 kg/m³ and an apparent specific mass of 600-800 kg/m³. This product had an attractive light yellow appearance, was crisp, and had a neutral taste, which makes it eminently suitable for application as semi-manufactured article of many foodstuffs.

I claim:

1. A method of treating soybeans, comprising:
   soaking the soybeans in liquid, whereby the soybeans become swollen;
   draining the soybeans;
   fixing the outer surface layers of the swollen soybeans by exposing the soybeans to heat; and
   thereafter substantially removing the interior moisture from the fixed soybeans.

2. The method according to claim 1, wherein the outer surface layers are fixed by exposing the soybeans to temperatures ranging from about 250° C. to about 350° C. or about 9 to 15 minutes.

3. The method according to claim 2, wherein the interior moisture is removed by exposing the soybeans to temperatures ranging from about 150° C. to about 250° C. for about 18 to 30 minutes.

4. A soybean treated in accordance with the process of claim 2.

5. A method of preparing a roasted, nut-like product from soybeans, comprising the steps of:
   deskinning and splitting raw soybeans into bean halves;
   soaking the bean halves in water at temperatures of about 20° C. to about 100° C. to a moisture content of about 50-65%;
   dewatering the bean halves; and
   drying and roasting the dewatered bean halves at temperatures from about 160° C. to about 350° C., said step of drying and roasting comprising:
   first exposing the dewatered bean halves for a first time to a temperature from about 250° C. to about 350° C. for fixing the outer surface layer of the soybeans, and
   second exposing the soybeans, which have their outer surface layer fixed, for a second time longer than the first time to a temperature from about 160°-250° C. for removal of interior moisture.

6. A method according to claim 5, wherein said step of soaking the soybeans comprises:
   blanching the soybeans at a temperature from about 60° C. to about 85° C., and
   soaking the soybeans at a temperature from about 85° C. to about 100° C.

7. A method according to claim 5, wherein said step of trying and roasting further comprises:
   passing the dewatered soybeans through a first hot air drying stage at an inlet temperature of about 250° C. and an outlet temperature of about 90° C.,
   passing the soybeans through a second hot air drying stage at an inlet temperature of about 220° C. and an outlet temperature of about 115° C., and
   passing the soybeans through a third hot air drying stage with an inlet temperature of about 160° C. and an outlet temperature of about 100° C., the time in each of these trying stages being about 10 to 15 minutes 8. A soybean treated in accordance with the process of claim 5.

* * * * *